Figure 1:
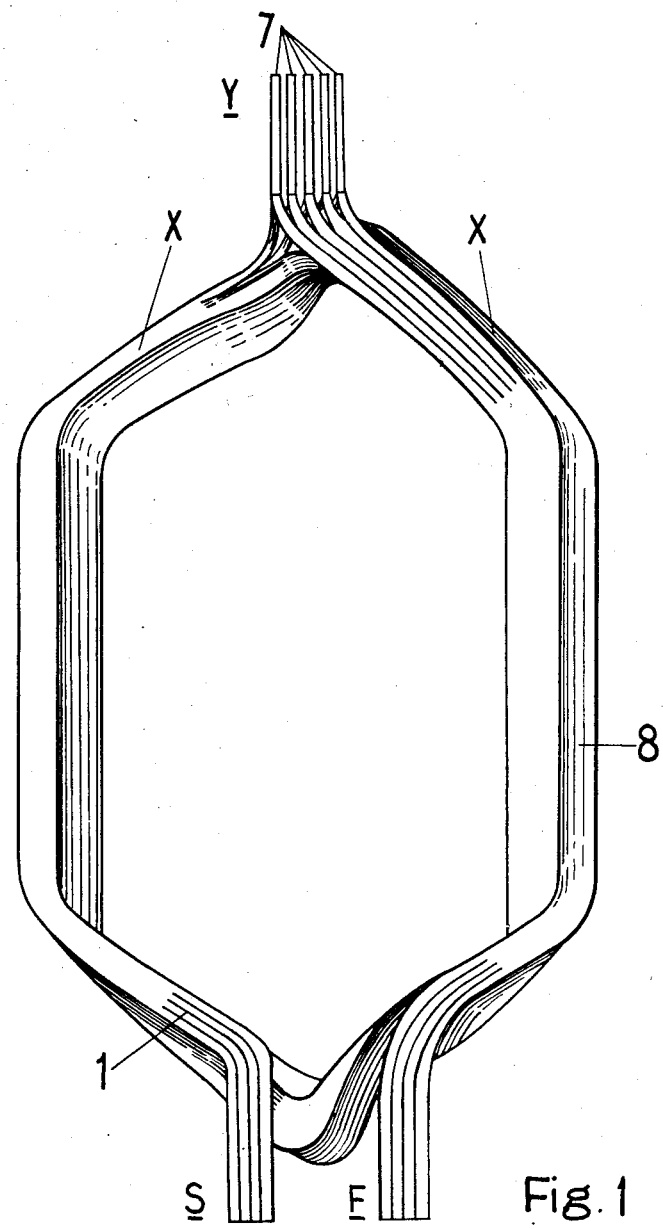

INVENTOR
George Herbert Fletcher

Jan. 12, 1960

G. H. FLETCHER 2,921,207

DYNAMO ELECTRIC MACHINES

Filed June 26, 1956

2 Sheets-Sheet 2

INVENTOR
GEORGE HERBERT FLETCHER
BY
Kirschstein, Kirschstein & Ottinger
ATTORNEYS

United States Patent Office 2,921,207
Patented Jan. 12, 1960

2,921,207

DYNAMO ELECTRIC MACHINES

George Herbert Fletcher, Appleby, Westmorland, England; Helen Gordon Fletcher and Alfred Lantham Fletcher, executors of said George Herbert Fletcher, deceased Application June 26, 1956, Serial No. 594,057

Claims priority, application Great Britain June 29, 1955

2 Claims. (Cl. 310—206)

This invention relates to dynamo electric machines and particularly to windings for armatures of dynamo electric machines having commutators.

A common form of lap or multiple circuit winding for the armature of say a direct current electric traction motor has the conductors of a coil or a winding arranged side by side on edge in an armature slot and the full section of a conductor is connected into the slotted commutator neck or riser for the purpose of connecting the coil to the commutator and also for connecting associated coils together at the commutator. This form of winding has certain limitations, one being that the depth of a conductor in a slot affects copper eddy current losses making it necessary in many cases for the conductors to be split into sections and insulated, thereby reducing the amount of space available for conductor copper in a slot of given size in an armature core. Another limitation is that the risers of the bars of the commutator must have sufficient radial depth to allow two conductors of adjacent coils, to be connected together in each riser slot. This is a disadvantage particularly in the case of machines where it is desirable to have a large commutator diameter with regard to the diameter of the armature core.

Another known form of lap or multiple circuit winding has the conductors of a coil arranged one on top of the other in an armature slot, each conductor extending substantially across the width of the slot and the conductors connected with the commutator being twisted through approximately 90°. This form of winding reduces the effective depth of a conductor in an armature slot compared with the other form of winding referred to above, keeping eddy current losses to a minimum without the need for splitting the conductors into sections, but has the disadvantage that considerable mechanical effort is often required for imparting the 90° twist to the conductors. Additionally, it is often necessary, in order to improve commutation, for one of the conductors of a coil, and this applies to the other form as well, to be pitched one armature slot more or less than the rest of the coil conductors and this separately pitched conductor, usually referred to as "the orphan limb," has to be insulated for full supply voltage, the space available for conductor copper in the armature slots being thereby reduced. As in the other known form of winding, the commutator risers have to be of sufficient radial depth to allow two conductors to be connected into each riser.

One object of the present invention is the provision of a lap or multiple winding for the armature of a dynamo electric machine which avoids the various limitations referred to above.

According to one aspect of the present invention, in a winding for the armature of a dynamo electric machine having a commutator, the conductors of an armature coil are arranged in their armature slots one above the other with the widths of the conductors extending across the slots, each conductor is sub-divided across its width in the slot into a plurality of sections, and at least one of the sections is extended beyond the remaining section or sections at what is normally regarded as the nose or back end of the armature coil to form a commutator connection.

The invention includes an armature coil for a dynamo electric machine having a commutator, in which the conductors on the two sides of the coil lie one above the other and are arranged to extend with their widths across the armature slots, are sub-divided across their widths into a plurality of sections, and at what is normally regarded as the nose or back end of the coil, are each provided with an extension of at least one section adapted to form a commutator connection.

Thus, each conductor may consist of a number of separate sections or strands of say copper laid side by side and only one strand be extended to form a commutator connection, all the strands being, of course, electrically connected together.

The invention may be applied with particular advantage to lap or multiple armature windings but it may also be applied to wave windings.

Figure 2:
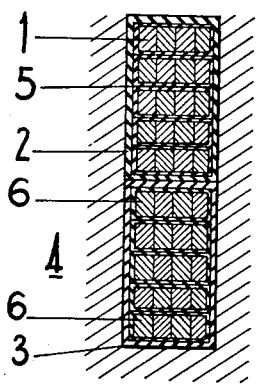
Figure 3:
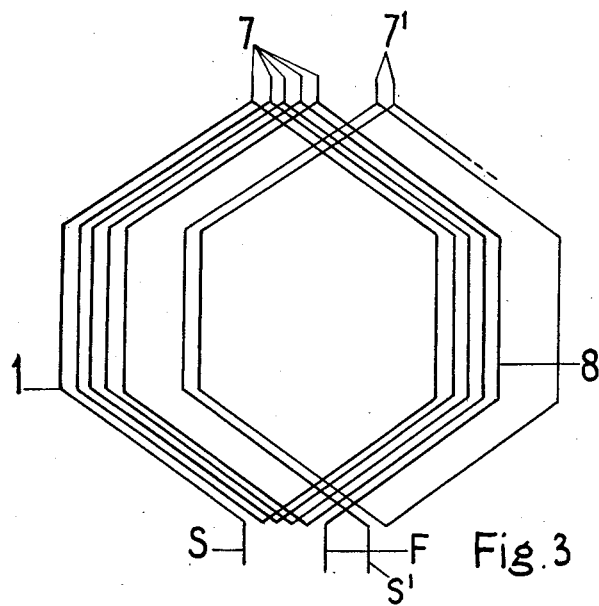

In order that the invention may be clearly understood, one construction of a lap wound coil for the armature of a direct current electric traction motor will now be described by way of example with reference to Figures 1, 2 and 3 of the accompanying drawings in which Figure 1 is a perspective view of the coil, Figure 2 a cross-sectional view showing how the conductors of one side of the coil are arranged in an armature slot with the one side of an associated coil, and Figure 3 is a diagrammatic showing of the coil which illustrates one particular advantage of the coil construction.

Referring now to the drawing, the coil has five turns of a single conductor 1 and this conductor 1 is made up of four similar sections of copper laid side by side to form a flat strip which, except for insulation 2 (see Figure 2), extends across the full width of the slot 3 in the armature core 4. The turns of the coil are insulated one from the other by insulation 5 and the one side of the coil with conductors 1 lies above one side of another coil with similar conductors 6. The strands or sections of the conductors 1 in each turn and on both sides of the nose are electrically connected together by brazing or any other suitable method, at the points marked X in Figure 1 to ensure that current is equally distributed between the sections of the conductors 1 and at what is normally the nose or back end Y of the coil, one section of each length of conductor is extended to form a loop 7, there being five loops 7 in all for connection to the commutator risers (not shown) of the electric motor.

The start S and finish F of the coil are disposed remotely from the commutator end Y and are arranged so as to be in convenient position to form coil to coil connections when wound into the armature, coil to coil connection in the commutator risers being avoided. The start and finish points also provide convenient points for the connection of equalizer windings.

As will be appreciated, the number of sections or strands of the conductors 1 will be determined by the need for a single section to have sufficient mechanical strength to form a satisfactory commutator connection and also to be large enough to carry current for the length of time that current is passing into and out of each commutator bar. The coil may be wound without difficulty because of its sectionalised or stranded construction, on a shuttle former in well known manner, with the exception that winding is commenced not at the nose or back end Y but at the start point S. Each time the sectionalised or stranded conductor passed around the commutator end of the shuttle former, a single section would be looped to extend or project beyond the end of the coil to form the loops 7 for the commutator connections. After winding on the shuttle former, the coil would be removed, pulled out into shape in known manner and then suitably prepared and insulated for insertion in the armature slots.

It will be appreciated from consideration of Figures 1 and 3, that the uppermost conductor 8 in association with the next coil having loops 7¹, pitches one slot less than the rest of the coil conductors, giving improved commutating conditions obtained with an orphan coil as described above but without the need for separate slot insulation and consequent loss of copper space in the slots.

It is not necessary that the actual loop 7 is inserted in the commutator riser since in practice it will be found more convenient for the rounded part of the loop to be cut away and either the upper or lower strand or section or both to be inserted in the riser. As the depth required to accommodate the strand or strands is therefore relatively small, the diameter of the commutator face can be made nearly equal to that of the riser, with advantages, such as saving commutator copper, known to those skilled in the art.

Although a single turn coil is illustrated in the drawing, it will be obvious to those skilled in the art that the invention may also be applied to multi-turn coils. Thus, in the case of a two turn coil, each conductor could lie the full width of its slot and a tapping be taken out from the nose end at alternate turns, and connected to the commutator.

Additionally, the invention can be applied to coils in which the conductors lie vertically in the slots instead of with their widths extending across the slots. Thus, the invention can be applied to a coil having single conductors in a slot, each side of the coil having its conductor arranged vertically in the slot and divided vertically into two or more sections, at least one of which sections is extended to the commutator. If a coil possess a number of conductors lying side by side in a slot, then each conductor would be similarly treated. It will, of course, be evident to those skilled in the art that such arrangements will have many of the advantages of the arrangements described above with conductors arranged in a pile in a slot, although some advantages will be lost.

I claim:

1. An armature coil for a dynamo electric machine having a commutator, said armature coil comprising at least one conductor in each of the two sides of the coil, which conductor is subdivided across its width into a plurality of sections electrically connected together, at least one section of each conductor being extended beyond the remaining sections at the nose end of said coil remote from its starting and finishing leads, to form a commutator connection.

2. An armature coil for a dynamo electric machine having a commutator, said armature coil comprising a plurality of conductors in each of the two sides of the coil adapted to lie one above the other with their widths extending across an armature slot, each conductor being subdivided across its width into a plurality of sections electrically connected together and at least one section of each conductor being extended beyond the remaining sections at the nose end of said coil remote from its starting and finishing leads, to form a commutator connection.

References Cited in the file of this patent

UNITED STATES PATENTS

| | | |
|---|---|---|
| 1,306,625 | Priest | June 10, 1919 |
| 1,345,484 | Fisher et al. | July 6, 1920 |
| 1,677,007 | Summers | July 10, 1928 |
| 2,182,654 | Bollinger | Dec. 5, 1939 |
| 2,201,845 | Wieseman | May 21, 1940 |
| 2,743,508 | Isaacson | May 1, 1956 |